US011113875B1

(12) United States Patent
Monaghan et al.

(10) Patent No.: US 11,113,875 B1
(45) Date of Patent: Sep. 7, 2021

(54) VISUALIZATION TOOLS FOR POINT CLOUDS AND 3D IMAGERY

(71) Applicant: Illuscio, Inc., Culver City, CA (US)

(72) Inventors: Robert Monaghan, Ventura, CA (US); Joseph Bogacz, Perth (CA); Kevan Spencer Barsky, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/152,458

(22) Filed: Jan. 19, 2021

(51) Int. Cl.
*G06T 7/73* (2017.01)
*G06T 17/00* (2006.01)

(52) U.S. Cl.
CPC .......... *G06T 17/00* (2013.01); *G06T 7/75* (2017.01); *G06T 2207/10028* (2013.01); *G06T 2210/56* (2013.01)

(58) Field of Classification Search
CPC ......... G06T 7/75; G06T 17/00; G06T 19/003; G06T 2207/10028; G06T 2210/56
See application file for complete search history.

(56) References Cited

U.S. PATENT DOCUMENTS

2005/0223337 A1* 10/2005 Wheeler .............. G06T 19/00
715/806
2014/0115541 A1* 4/2014 Mandel .............. G06T 11/206
715/836

OTHER PUBLICATIONS

Alam, Nashid, Predrag R. Bakic, and Reyer Zwiggelaar. "Three-dimensional modeling of microcalcification clusters using breast tomosynthesis: a preliminary study." 15th International Workshop on Breast Imaging (IWBI2020). vol. 11513. International Society for Optics and Photonics, 2020 (Year: 2020).*
Rau et al., "Analysis of Oblique Aerial Images for Land Cover and Point Cloud Classification in an Urban Environment", IEEE Transactions on Geoscience and Remote Sensing, Mar. 2015 (Year: 2015).*
Sitek et al., "Tomographic Reconstructions Using an Adaptive Tetrahedral Mesh Defined by a Point Cloud", IEEE Transactions on Medical Imaging, Sep. 2006 (Year: 2006).*

* cited by examiner

*Primary Examiner* — Diane M Wills
(74) *Attorney, Agent, or Firm* — Ansari Katiraei LLP; Arman Katiraei; Sadiq Ansari

(57) ABSTRACT

Provided is a three-dimensional ("3D") analysis tool or device for generating visualizations for attributes in different multi-plane slice of a point cloud or 3D image. The device may receive a point cloud with a plurality of data points that are distributed across a plurality of different planes and that collectively produce a 3D image. The device may select a set of the plurality of data points that are located within a particular slice of the point cloud, may generate a visualization from one or more attributes of the set of data points, and may present the visualization of the one or more attributes for the set of data points in a different format than a rendering of the set of data points.

19 Claims, 13 Drawing Sheets

VISUALIZATION TOOLS FOR POINT CLOUDS AND 3D IMAGERY

BACKGROUND

Each pixel in a two-dimensional ("2D") image may be associated with one or more attributes. For instance, each pixel may have red, green, blue, and/or other color attributes and a luminosity attribute. Analysis of the one or more attributes across the entire 2D image may be performed to improve image acquisition, processing, editing, and/or delivery. Such analysis may not apply to a point cloud or three-dimensional ("3D") because of the multiple layers of attributes at different depths or planes of point cloud or 3D image that may result in the analysis being disassociated from the rendering of the point cloud or 3D image on a display.

DETAILED DESCRIPTION OF PREFERRED EMBODIMENTS

Figure 1:
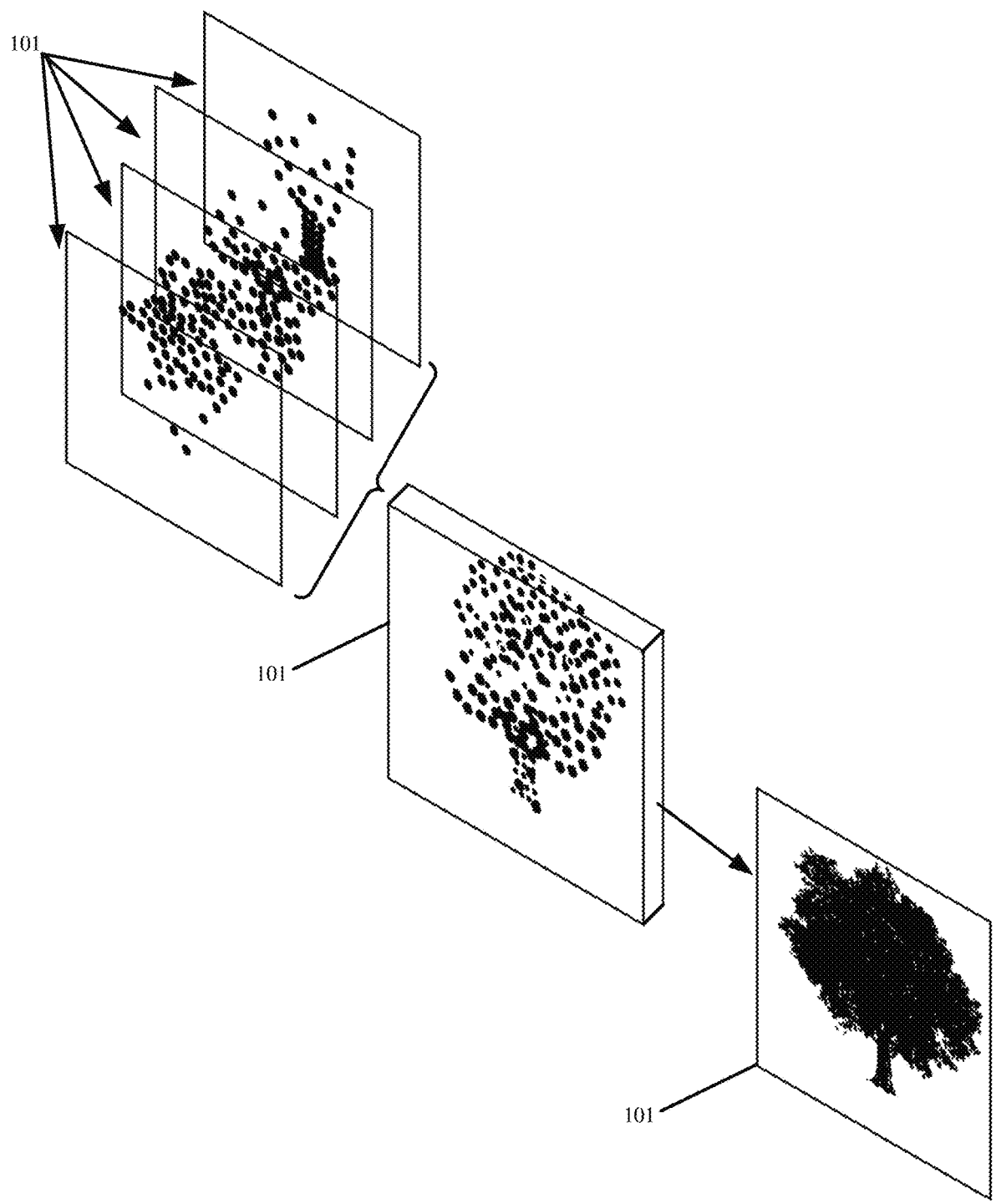
FIG. 1 illustrates an example point cloud or three-dimensional ("3D") image in accordance with some embodiments presented herein.

The following detailed description refers to the accompanying drawings. The same reference numbers in different drawings may identify the same or similar elements.

Provided are systems and methods for analyzing and visualizing attributes at different depths and/or planes in a point cloud or three-dimensional ("3D") image, and/or for dynamically adapting the visualizations to track the presentation of the point cloud or 3D image as the viewing position within the point cloud or 3D image changes. In particular, a 3D analysis tool may dynamically produce one or more planar visualizations that provide different representations for the attribute information from corresponding planes of a rendered 3D environment or 3D object, and the 3D analysis tool may change the one or more planar visualizations to track rotation, tilting, orientation, and/or repositioning of the rendered 3D environment or 3D object.

In some embodiments, each visualization generated by the 3D analysis tool may provide a distribution, attribute range, histogram, waveform, density map, depth map, and/or other analysis for the attributes within a different slice of the point cloud or 3D image. A slice may include a set of data points that is fewer than all data points in the point cloud or 3D image, and may include data points at different depths and/or planes. For instance, a slice may include the frontmost data points at a current viewing position of the point cloud or 3D image, the set of data points positioned along a particular plane that is derived from the current viewing position, the set of data points within a volume extending from the current viewing position, and/or the set of data points within a user-defined volume. Accordingly, the 3D analysis tool may programmatically select a set of all data points from the point cloud and/or 3D image that are within a slice defined by the current viewpoint position or a user-defined volume.

The 3D analysis tool may generate a layered visualization and/or 3D visualization to present the attribute data from the data points in a particular slice. The layered and/or 3D visualization may isolate one or more attributes for the data points in the particular slice, and may provide an alternate presentation for the one or more attributes that differs from a direct rendering of the one or more attributes at positions in 3D space that are defined for each of the data points. In some embodiments, the 3D analysis tool may generate the visualization by mapping, converting, and/or otherwise evaluating the one or more attributes from one format, scale, range, distribution, and/or presentation to another. The 3D analysis tool may then simultaneously present the generated visualization, that includes the alternative presentation for the one or more attributes of the data points in the particular slice, along with a rendering of the same data points in 3D space to provide a direct association between the visualization and the rendering of the data points.

In some embodiments, the visualization may present one or more attributes for data points at different planes or depths with different graphical representations and/or other visual differentiation. In some such embodiments, the visualization may map the attributes at different planes or depths in the 3D point cloud, 3D image, and/or 3D space to a two-dimensional ("2D") presentation, and may use the different graphical representations and/or other visual differentiation to retain the plane, depth, and/or relative positioning information for the set of data points.

In some embodiments, the visualization may present one or more attributes for data points at different planes or depths through a 3D representation that is aligned with a 3D rendering of the data points at the different planes or depths. For instance, the 3D analysis tool may produce a different distribution, percentage allocation, and/or other mapping for the attributes at each plane or depth in the visualized slice, and may order or layer each visualization in the same manner by which each plane or depth is rendered is presented to a user device. In some such embodiments, the 3D analysis tool may convert the attribute data from a first 3D format (e.g., individual data points in the 3D point cloud or 3D image) to a different second 3D format (e.g., a layered or superimposed histogram).

FIG. 1 illustrates an example point cloud or 3D image 101 in accordance with some embodiments presented herein. As shown in FIG. 1, point cloud or 3D image 101 may be constructed by different sets of data points positioned at different planes or depths in 3D space. Each point cloud data point may correspond to a part of an imaged object or environment for which attribute data is captured.

Each point cloud data point may include positional information such as a set of coordinates for locating the data point in 3D space. For instance, each point cloud data point may include x-coordinate, y-coordinate, and z-coordinate data point elements to represent the position of the imaged part in the 3D space.

Each point cloud data point may also include non-positional information or data point elements for the captured attributes of the imaged object at the position identified by the positional information. In some embodiments, the attributes of a particular data point may include red, green, blue, and/or other color components (e.g., cyan, yellow, etc.) for the part of the imaged object represented by the particular data point. In some embodiments, the attributes of a particular data point may include the chrominance, luminance, hue, saturation, brightness, reflectivity, and/or other visual characteristics for the part of the imaged object represented by the particular data point. In some other embodiments, the attributes may be related to properties of the imaging device used to capture the object part at a particular data point. For instance, the attributes may include a Tesla strength value to quantify the strength of the magnetic field that was used in detecting and/or imaging the object part. In some embodiments, the attributes may correspond to measurements, and may include values for measured energy, sound, temperature, and/or other characteristics of the imaging device or the object being imaged.

Each point cloud data point may include an array of data point elements. The array of data point elements may provide the positioning of the data point in 3D space as well as one or more attributes for the part of the imaged object represented by that data point. For instance, a point cloud data point may be stored and/or represented as an array of data point elements with some combination of x-coordinate, y-coordinate, z-coordinate, red, green, blue, chrominance, luminance, tesla, and/or other values. The point cloud data points and the values of their corresponding data point elements may be generated by a 3D or depth-sensing camera, Light Detection and Ranging ("LiDAR"), Magnetic Resonance Imaging ("MRI") devices, Positron Emission Tomography ("PET") scanning devices, Computerized Tomography ("CT") scanning devices, time-of-flight devices, and/or other imaging equipment.

Figure 2:
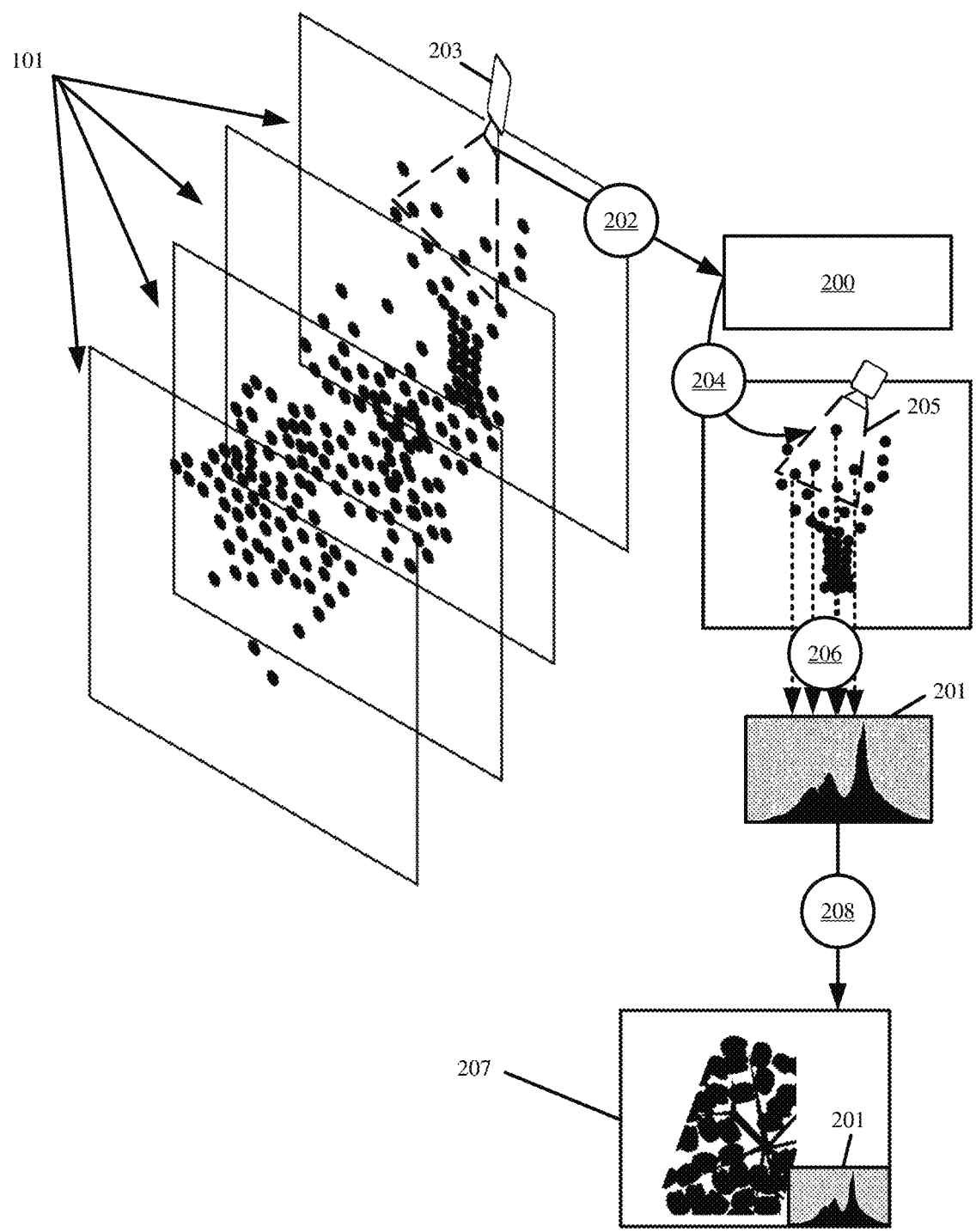
FIG. 2 illustrates an example visualization for a set of data points in a point cloud or 3D image in accordance with some embodiments presented herein.

FIG. 2 illustrates example visualization 201 for a set of data points in point cloud or 3D image 101 in accordance with some embodiments presented herein. In particular, FIG. 2 illustrates 3D analysis tool 200 generating visualization 201 based on current viewing position 203 in point cloud or 3D image 101.

Viewing position 203 may correspond to a location in the point cloud from which point cloud 101 or part of point cloud 101 is rendered or displayed. For instance, viewing position 203 may correspond to the position of a virtual camera in point cloud 101.

3D analysis tool 200 may track or determine (at 202) viewing position 203 based on the movement, orientation, rotation, and/or other positioning of the virtual camera in point cloud 101 or an application for displaying and/or interacting with point cloud 101. In some embodiments, viewing position 203 may be defined by a user, or may correspond to a waypoint that is defined in point cloud 101.

3D analysis tool 200 may define (at 204) point cloud slice 205 based on properties associated with viewing position 203. For instance, point cloud slice 205 may include the set of point cloud data points that are within the field-of-view of the virtual camera. In some embodiments, defining (at 204) point cloud slice 205 may include determining the point cloud data points that are aligned with one or more planes specified from viewing position 203, and excluding and/or filtering out the other data points. For instance, 3D analysis tool 200 may determine that viewing position 203 includes a particular viewing direction or vector based on a rotation, tilt, orientation, and/or position of the virtual camera. 3D analysis tool 200 may define one or more planes that are perpendicular to the particular viewing direction or vector and that are different distances or depths from viewing position 203. 3D analysis tool 200 may provide boundaries for each plane based on the field-of-view of the virtual camera and/or defined ranges that may depend on the depth or distance from viewing position 203.

As shown in FIG. 2, 3D analysis tool 200 may generate (at 206) visualization 201 by mapping one or more attributes of the selected data points in point cloud slice 205 to a different format or presentation. For instance, the selected data points may include a subset of data points within a particular plane of point cloud 101, and visualization 201 may provide a 2D representation for an isolated subset of attributes from the selected data points. In some embodiments, the 2D representation may include a histogram, waveform, vectorscope, and/or other visualization for the distribution, percentage allocation, and/or other mapping of a particular attribute from the selected data points. Visualization 201 may be displayed (at 208) with rendering 207 of point cloud or 3D image 101 from current viewing position 203.

In some embodiments, 3D analysis tool 200 may provide a user interface element for changing which of the one or more attributes are presented in the visualization. For instance, 3D analysis tool 200 may provide the distribution for any of the red, green, blue, luminosity, chrominance, and/or other attributes stored within the non-positional data elements of the selected data points based on the setting of the user interface element.

Figure 3:
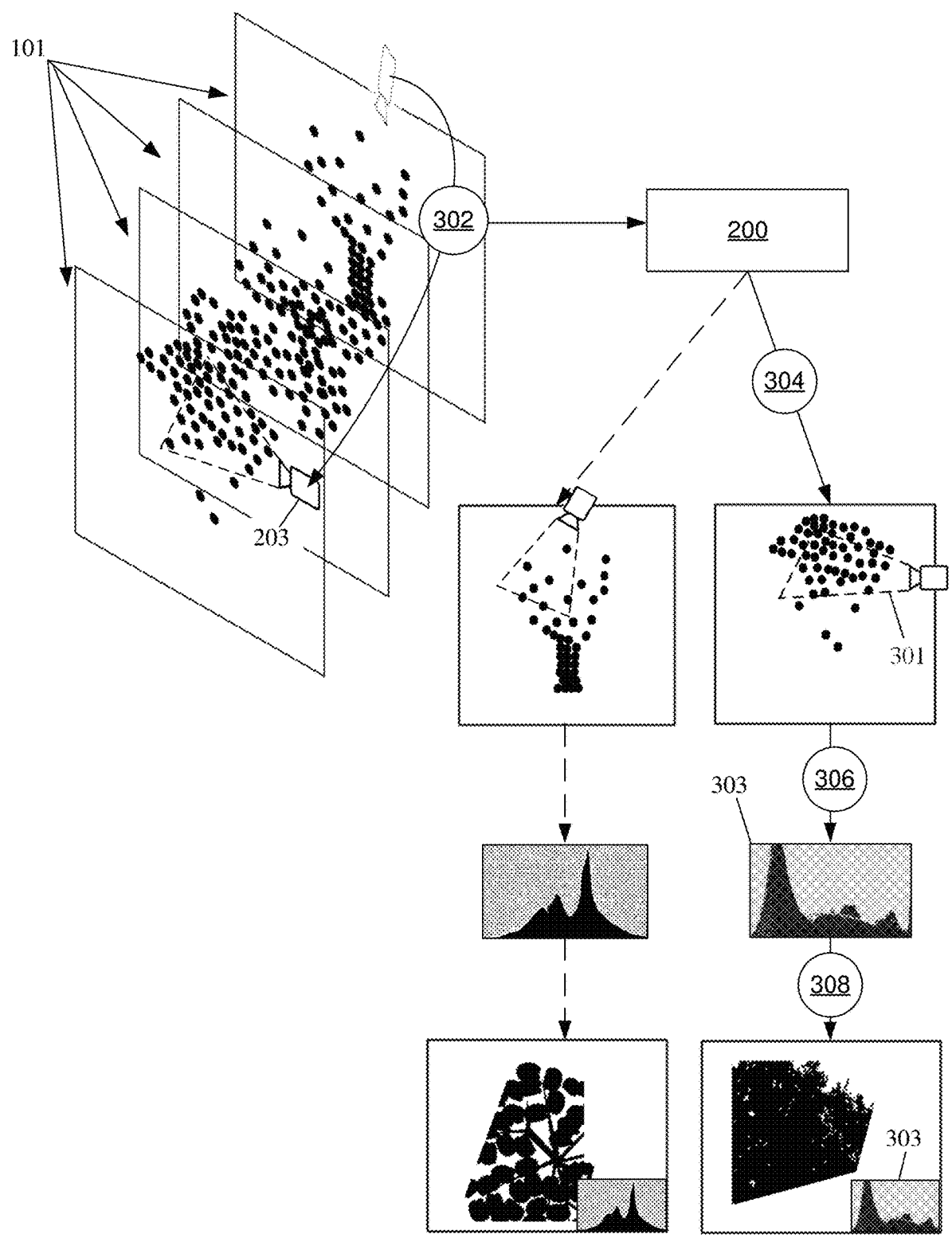
FIG. 3 illustrates an example of dynamically updating a visualization to track movement in a point cloud or 3D image in accordance with some embodiments presented herein.

3D analysis tool 200 may detect changes to viewing position 203, and may dynamically adjust visualization 201 to track viewing position 203 and to provide an alternate presentation for attributes of a different set of data points that fall within a new slice derived from the changed viewing position 203. FIG. 3 illustrates an example of dynamically updating visualization 201 to track movement in point cloud or 3D image 101 in accordance with some embodiments presented herein.

A user may move viewing position 203 from a first position to a second position. In some embodiments, the user may use an input device to tilt, rotate, reorient, and/or otherwise reposition viewing position 203 within point cloud 101. In some embodiments, the user may provide input that moves the viewing position from a first waypoint to a second waypoint defined in point cloud 101, and each waypoint may specify a particular viewing angle, direction, and/or position.

3D analysis tool 200 may detect (at 302) the repositioning of viewing position 203, may determine the parameters (e.g., tilt, rotation, direction, etc.) of updated viewing position 203, may define (at 304) new point cloud slice 301 from updated viewing position 203, may obtain (304) the attributes for the new set of data points within point cloud slice 301, and may generate (at 306) updated visualization 303 to present the attributes for a different set of data points included in new point cloud slice 301. 3D analysis tool 200 may present (at 308) updated visualization 303 with the updated rendering of point cloud 101 at updated viewing position 203. In particular, updated visualization 303 may have a direct association with the part of point cloud or 3D image that is selected for display, wherein the direct association may include presenting a distribution, range, histogram, waveform, and/or other evaluation for one or more attributes of the new set of data points in the 3D space being displayed. In some embodiments, 3D analysis tool 200 may generate (at 306) updated visualization 303 in real-time in response to each detected movement of viewing position 203.

Accordingly, visualization 303 from the second viewing position may present the attributes for a different set of data points from same point cloud 101 than visualization 201 from the first viewing position. In this manner, 3D analysis tool 200 may dynamically change the provided visualizations to track portions of point cloud or 3D image 101 that are displayed onscreen, and to present an isolated set of attributes from the tracked portions.

Figure 4:
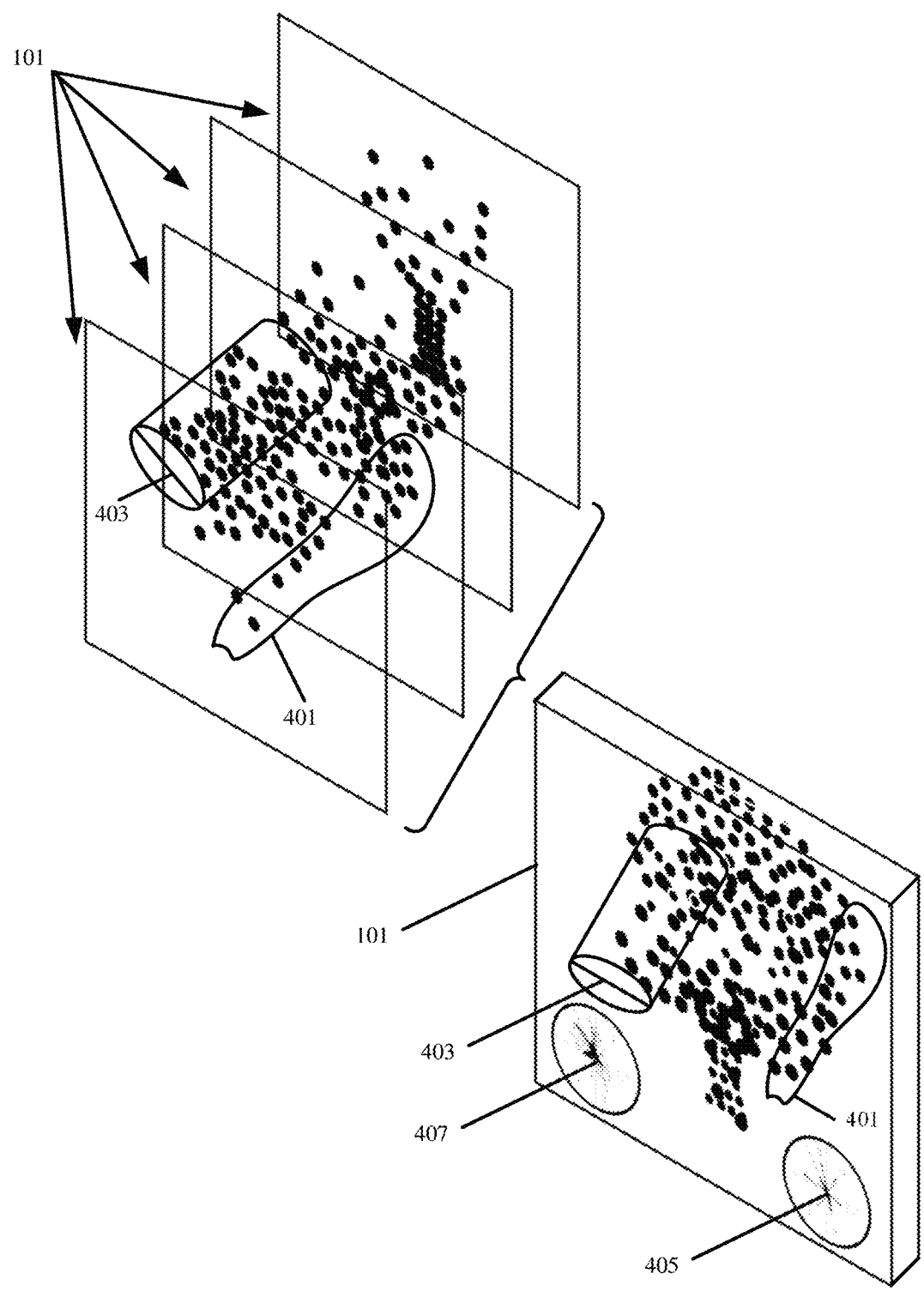
FIG. 4 illustrates a first user-defined selection that includes a set of data points selected by a user, and a different second user-defined selection that includes a set of data points within a regular-shaped or irregular-shaped volume defined by the user.

In some embodiments, the point cloud slice may be defined based on a user input for selecting a set of point cloud data points, or for setting a volume in a 3D image or 3D space. FIG. 4 illustrates an example of customizing the attribute visualization based on a user-defined selection of 3D space in accordance with some embodiments presented herein.

FIG. 4 illustrates first user-defined selection 401 that includes a set of data points selected by a user, and different second user-defined selection 403 that includes a set of data points within a regular-shaped or irregular-shaped volume defined by the user. For instance, the user may place and size a sphere, cone, cylinder, cube, or other volumetric shape to define the set of data points and/or the slice that includes the set of data points from which one or more visualizations may be generated. In FIG. 4, second user-defined selection 403 may be based on a cylinder that encompasses a volume of 3D space in which a set of data points are located. In some embodiments, first user-defined selection 401 may be defined via a set of coordinates that fall within the 3D space represented by a point cloud or 3D image.

3D analysis tool 200 may determine the set of data points that are located within each user-defined selection 401 and 403, may obtain the attributes for each set of data points, may perform an analysis or evaluation of the attributes, and may generate one or more visualizations based on the analysis or evaluation of the attributes from the selected set of attributes. For instance, 3D analysis tool 200 may generate and provide first visualization 405 for attributes of the first set of data points within first user-defined selection 401, and may generate and provide second visualization 407 for attributes of the second set of data points within second user-defined selection 403. In some embodiments, first visualization 405 and second visualization 407 may be simultaneously displayed when first user-defined selection 401 and second user-defined selection 403 are active at the same time, or may separately present visualizations 405 and 407 based on the selection of one set of data points within first user-defined selection 401 or second user-defined selection 403.

As shown in FIG. 4, user-defined selections 401 and 403 and/or slices determined by 3D analysis tool 200 may encompass data points on multiple planes and/or at different depths of point cloud 101. In other words, the set of data points from which to generate the attribute visualization may include overlapping data points that have one of the same positional coordinate (e.g., the same x-coordinate value) and at least two different positional coordinates (e.g., different y-coordinate values and z-coordinate values).

In some embodiments, 3D analysis tool 200 may map the attributes of overlapping data points to the same 2D visualization. In some such embodiments, 3D analysis tool 200 may differentiate the overlapping data points using different visual queues (e.g., coloring, brightness, graphical elements, and/or the like).

Figure 5:
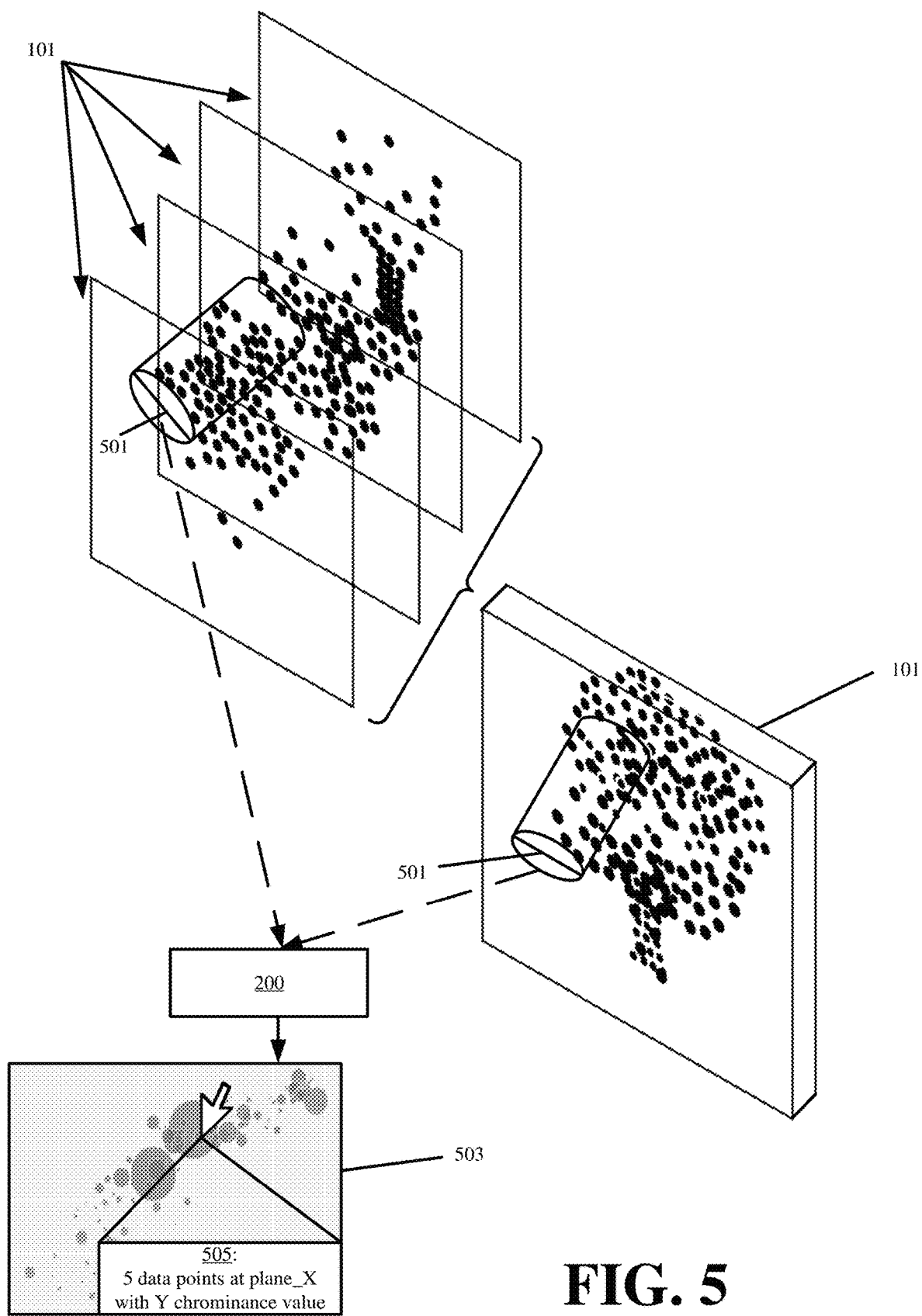
FIG. 5 illustrates an example two-dimensional ("2D") attribute visualization that is generated for a set of data points overlapping in 3D space in accordance with some embodiments presented herein.

FIG. 5 illustrates an example 2D attribute visualization that is generated for set of data points 501 overlapping in 3D space in accordance with some embodiments presented herein. Set of overlapping data points 501 may include data points with one common coordinate and at least one different coordinate (e.g., data points at different vertical and/or depth offsets in point cloud 101). For instance, set of overlapping data points 501 may include data points that are located within a user-defined cylindrical volume, wherein the volume includes the same circular plane at different depths (e.g., different z-coordinate values) and/or different vertical or horizontal offsets (e.g., different x-coordinate or y-coordinate values) in point cloud 101.

3D analysis tool 200 may obtain one or more attributes for set of overlapping data points 501, and may also obtain the positional information for set of overlapping data points 501. 3D analysis tool 200 may evaluate the attributes, and/or may map the attributes from the first presentation in point cloud or 3D image 101 to different second presentation 503 based on the attribute values and/or the positional information.

As shown in FIG. 5, 3D analysis tool 200 may map the 3D presentation of the attributes from set of overlapping data points 501 in point cloud or 3D image 101 to 2D distribution 503 of the same attributes. 3D analysis tool 200 may provide different graphical elements to differentiate the attributes for data points at different depths or planes of point cloud 101. In other words, 3D analysis tool may superimpose different attribute values from 3D space about the same position in 2D presentation 503, and may use larger circles to represent attribute values for data points that are closest to a frontmost plane or that have the smallest z-coordinate positional value, and smaller circles to represent attribute values for data points that closest to a backmost plane or that have the largest z-coordinate positional value. By referencing the different graphical elements and 2D representation 503, a user may determine how the different attribute values for set of overlapping data points 501 in point cloud 101 are distributed at the different depths. It should be noted that in some other embodiments, other graphical differentiation may be provided in the generated visualization 503 to differentiate the attribute values for data points at different planes of a selected slice spanning multiple planes of point cloud 101.

In some embodiments, the exact data for the different planes and/or other differentiating data point data may be embedded in visualization 503, and may be accessed via a mouse-over or input provided at different points along visualization 503. As shown in FIG. 5, 3D analysis tool 200 may provide dynamic information 505 for a particular point of visualization 503 in response to detecting a pointer or other user input at the particular point of visualization 503.

Dynamic information 505 may include an indication as to the number of data points at one or more planes that have the attribute value represented at the particular point of visualization 503. In some embodiments, dynamic information 505 may be presented within a secondary visualization. The secondary visualization may provide a distribution for the particular attribute value, represented by the particular point of the original visualization, at different planes or positions in point cloud or 3D image 101. Accordingly, 3D analysis tool 200 may hierarchically present the attribute information based on positional and/or other differences in set of overlapping data points 501.

In some embodiments, 3D analysis tool 200 may generate a dynamic 3D visualization for one or more attributes of a set of data points falling within a 3D slice of point cloud or 3D image 101. In some such embodiments, 3D analysis tool 200 may modify the dynamic 3D visualization to match presentation and/or rendering of the set of data points.

Figure 6:
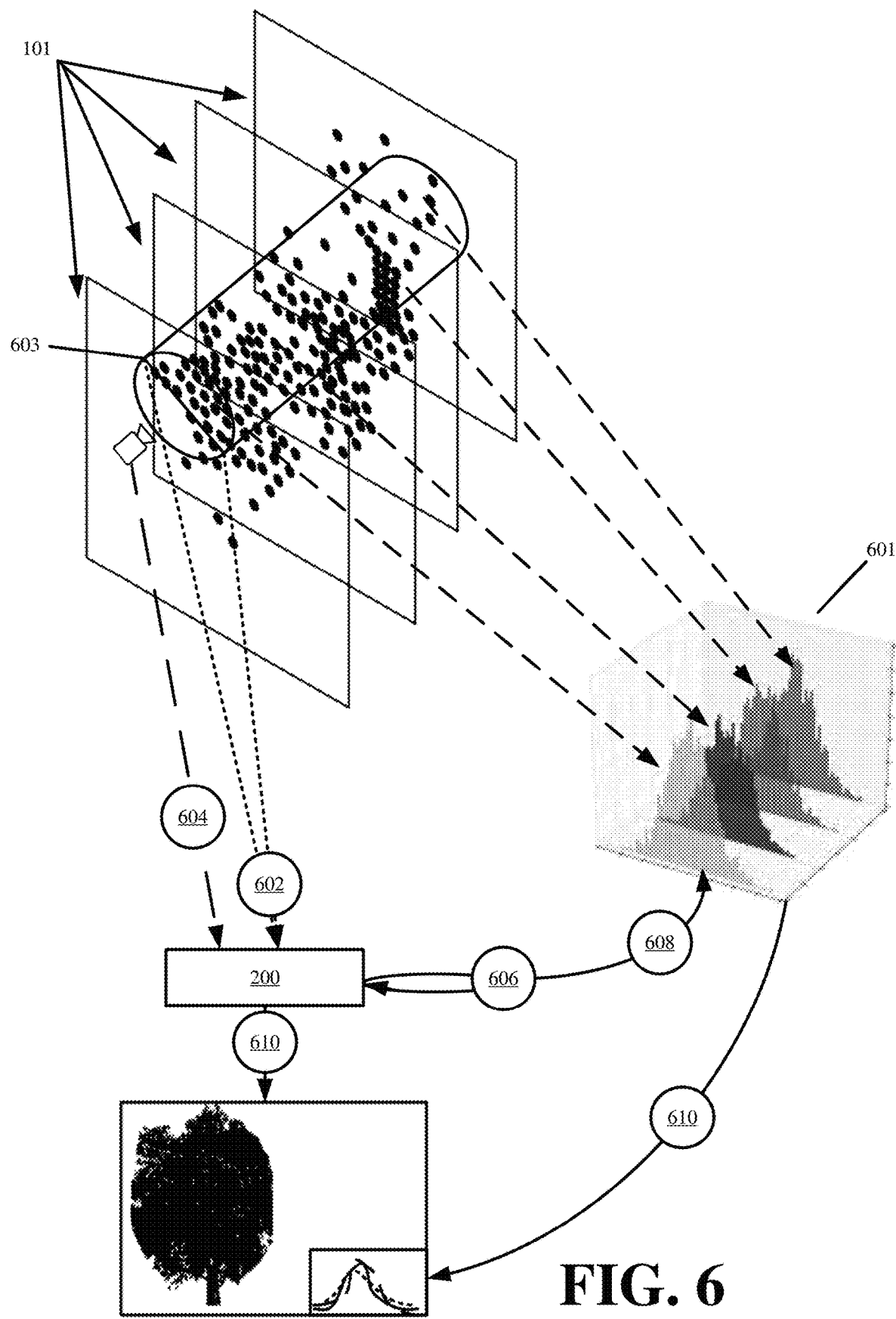
FIG. 6 illustrates an example of a dynamic 3D visualization that is provided based on the presentation of a particular volume of 3D space in a point cloud or 3D image in accordance with some embodiments presented herein.

FIG. 6 illustrates an example of dynamic 3D visualization 601 that is provided based on the presentation of a particular volume of 3D space in point cloud or 3D image 101 in accordance with some embodiments presented herein. 3D analysis tool 200 may receive a selection of the particular volume of 3D space. For instance, a user may specify coordinates for the particular volume of 3D space, the user may define a volumetric shape that encompasses the particular volume of 3D space, or 3D analysis tool 200 may define the particular volume of 3D space based on a current viewing position within point cloud or 3D image 101. In any case, the particular volume of 3D space corresponds to multi-plane slice 603 of point cloud or 3D image 101, and 3D analysis tool 200 may be configured to generate one or more 3D attribute visualizations based on the attribute values of the data points that are located within the particular volume of 3D space.

To generate the 3D attribute visualizations, 3D analysis tool 200 may select (at 602) a set of data points from point cloud or 3D image 101 that are located within the particular volume of 3D space, and may obtain (at 602) the attributes for the selected set of data points. Additionally, 3D analysis tool may determine (at 604) a current viewing position from which point cloud or 3D image may be rendered 101, and may determine the positioning and/or orientation of the selected set of data points relative to the viewing position. For instance, 3D analysis tool 200 may determine a first subset of the selected set of data points that are in a plane that is closest to the viewing position, and other subsets of the selected set of data points that are in planes further away from the viewing position. As shown in FIG. 6, the particular volume of 3D space that is selected for the 3D attribute visualization may correspond to the field-of-view of a camera, and/or the set of data points from point cloud 101 that may be rendered from the viewing position.

3D analysis tool 200 may isolate and/or process (at 606) one or more attribute values of the selected set of data points according to the determined relative positioning of the selected set of data points to the viewing position. In some embodiments, 3D analysis tool 200 may process (at 606) the one or more attribute values for each subset of the selected set of data points that is determined to be in a common plane from the viewing position. As before, processing (at 606) the one or more attribute values for a planar subset of data points may include determining the distribution, percentage allocation, waveform representation, and/or other representation for the one or more attribute values of data points in a common plane.

3D analysis tool 200 may produce (at 608) 3D visualization 601 based on the results from processing each subset of the selected set of data points in each plane from the viewing position. 3D visualization 601 may include a separate visualization for the attribute values of the data points in each plane. 3D analysis tool 200 may layer each separate visualization in 3D visualization 601 to match the rendering and/or presentation of each subset of data points in each plane. In other words, a particular subset of data points that are located in the plane closest to the viewing position may be rendered and/or presented as a topmost or frontmost layer of the selected set of data points, and the visualization for the particular subset of data points may be presented as the topmost or frontmost layer of 3D visualization 601. 3D analysis tool 200 may present (at 610) a rendering of the selected set of data points, and may embed 3D visualization 601 in the presentation to directly associate visualization to the onscreen presentation.

3D visualization 601 may change as the viewing position changes. For instance, when the viewing position is rotated so that a different second subset of data points fall within the plane closest to the viewing position, 3D analysis tool 200 may change 3D visualization 601 so that the topmost or frontmost visualization presents the processed attributed values for the second subset of data points. Similarly, visualizations at lower depths may be modified based on the attribute values of different subsets of data points that fall within the planes further removed from the modified viewing position. In this manner, 3D analysis tool 200 may change 3D visualization 601 to track the rendering of the point cloud data points, and to persistently maintain a direct correspondence between 3D visualization 601 and the point cloud presentation.

Figure 7:
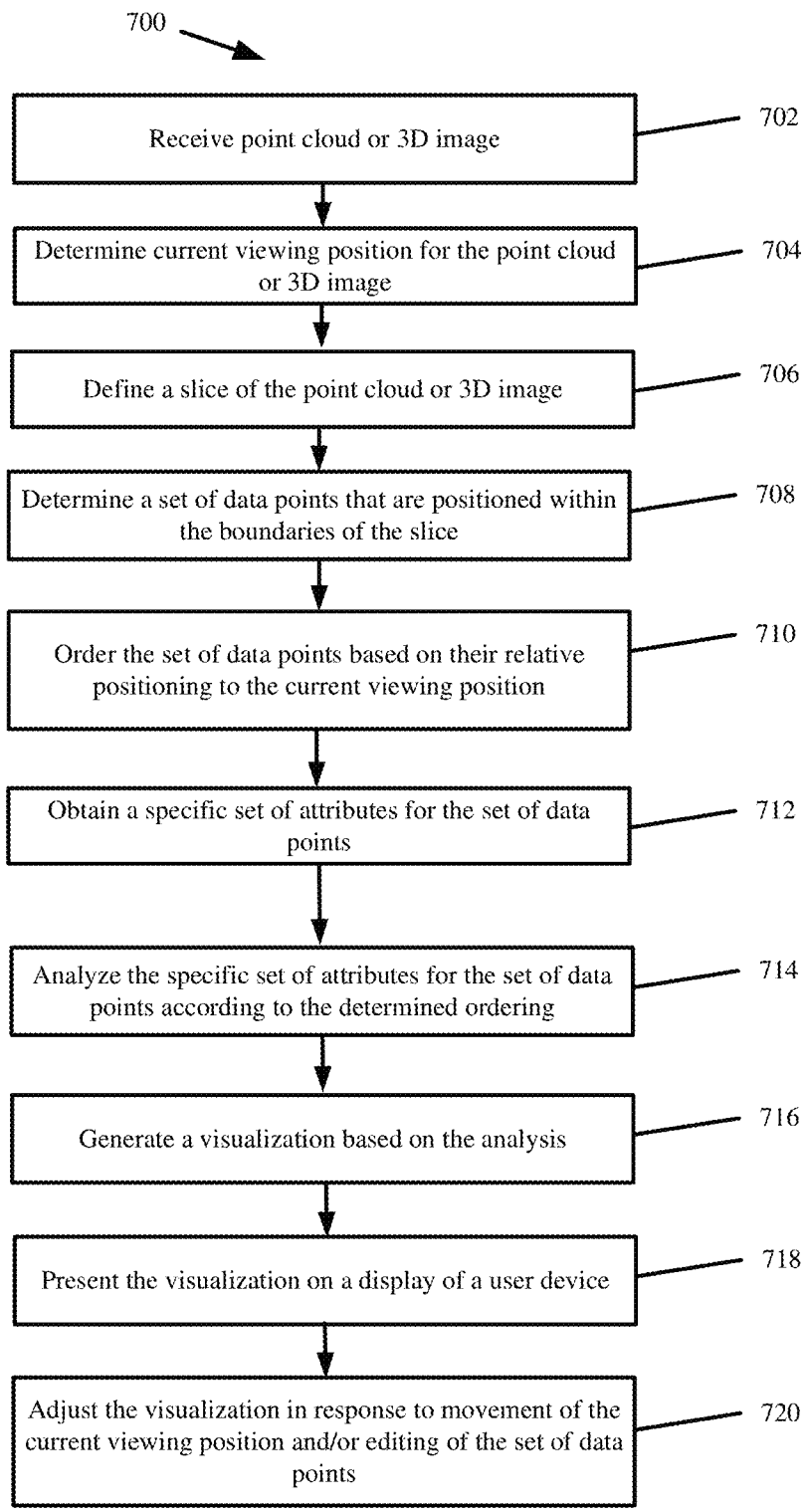
FIG. 7 presents a process for generating the attribute visualizations that dynamically track a presentation or rendering for parts of a 3D environment or 3D object in accordance with some embodiments presented herein.

FIG. 7 presents a process 700 for generating the attribute visualizations that dynamically track a presentation or rendering for parts of a 3D environment or 3D object in accordance with some embodiments presented herein. Process 700 may be implemented by 3D analysis tool 200.

Process 700 may include receiving (at 702) a point cloud or 3D image. As before, the point cloud or 3D image may include a several data points positioned in 3D space with different attributes for visual characteristics and/or other characteristics measured at corresponding points of a 3D environment or 3D object that is represented by the point cloud or 3D image. In some embodiments, receiving (at 702) the point cloud or 3D image may include opening and/or accessing a point cloud file, and/or loading in the data points from an imaging device or another device that is accessed via a data network.

Process 700 may include determining (at 704) a current viewing position for the point cloud or 3D image. The current viewing position may include a default position from which the 3D environment or 3D object represented by the point cloud or 3D image is first rendered, or may include a position that is established based on user input. In some embodiments, the current viewing position may correspond to a position of a virtual camera, and the current viewing position may also be determined based on the orientation (e.g., angle, tilt, etc.), field-of-view, focus depth, and/or other properties of the virtual camera and/or settings with which to render the data points from the viewing position. The viewing position may be set by 3D analysis tool 200, or another tool, application, or device that is embedded with 3D analysis tool 200 and that is used to display the point cloud or 3D image.

Process 700 may include defining (at 706) a slice of the point cloud or 3D image based on the current viewing position or a user selection made relative to the current viewing position. The slice may include a volume within the 3D space represented by the point cloud or 3D image. The volume may be defined with one or more boundaries to prevent the slice from encompassing a region that may be outside the field-of-view from the current viewing position, and/or a region that extends beyond the data points of the point cloud or 3D image. In some embodiments, defining (at 706) the slice may include receiving user input that define the boundaries or volume for the slice. In some other embodiments, defining (at 706) the slice may include 3D analysis tool 200 determining properties of a virtual camera positioned at the current viewing position, and defining the slice to encompass the virtual camera's field-of-view, thereby automatically defining the slice boundaries based on the virtual camera's properties or the rendered field-of-view.

Process 700 may include determining (at 708) a set of data points that are positioned within the boundaries of the slice. 3D analysis tool 200 may determine (at 708) the set of data points based on their positional information. In some embodiments, determining (at 708) the set of data points may include compressing the point cloud to isolate the analysis to the set of data points, and/or excluding other data points that are not within the selected slice from further analysis.

Process 700 may include ordering (at 710) the set of data points based on their relative positioning to the current viewing position. In some embodiments, 3D analysis tool 200 may order (at 710) the set of data points to different planes from the current viewing position. Each plane may be defined to be a different distance from the current viewing position, and to be perpendicular to the current viewing position. For instance, when the current viewing position is a straight front view into a 3D image, a first plane may be defined to include a first subset of the set of data points with a first z-coordinate value, and a second plane may be defined to include a second subset of the set of data points with a second z-coordinate value. If the current viewing position is angled or tilted, the planes may be defined based on two or more of the x, y, and z coordinates changing from plane to plane, and/or may be defined by a function that specifies coordinate values for different data points in a plane.

Process 700 may include obtaining (at 712) one or more attributes for the set of data points. The obtained attributes may be selected based on the analysis, processing, and/or visualization that 3D analysis tool 200 may generate for the received point cloud. For instance, 3D analysis tool 200 may be configured to generate a chrominance histogram for the received point cloud. 3D analysis tool 200 may therefore isolate and obtain (at 712) the chrominance value for each data point of the set of data points in order to generate the chrominance histogram.

Process 700 may include analyzing (at 714) the one or more attributes for the set of data points according to the determined ordering. Analyzing (at 714) the one or more attributes may include determining distributions, ranges, percentages, and/or derived values from the one or more attributes based on the ordering of the set of data points, wherein the ordering may cause 3D analysis tool 200 to analyze different subsets of the set of data points that are in different planes apart from subset of data points in other planes.

Process 700 may include generating (at 716) a visualization based on the analysis (at 714). Generating (at 716) the visualization may include providing an alternative presentation for the attributes of the set of data points that is different than how the attributes are presented in the point cloud or 3D image. For instance, a rendering of the point cloud may present the chrominance and/or other attributes of the data points at positions in 3D space corresponding to the positional information for each data point, and the generated (at 716) visualization may provide a histogram, waveform, and/or another presentation that maps the attribute values from the 3D space to a different scale, range, distribution, and/or other grouping. In some embodiments, generating (at 716) the visualization may include producing a 2D or 3D mapping for the obtained one or more attributes of the set of data points that summarizes the attribute values in an isolated or focused representation that excludes other attribute values of the set of data points, and/or that positions or presents the data points based on the isolated or focused attribute value rather than their positional information.

Process 700 may include presenting (at 718) the visualization on a display of a user device. In some embodiments, 3D analysis tool 200 may simultaneously present (at 718) multiple visualizations for different attributes of the set of data points. For instance, 3D analysis tool 200 may generate and present a first visualization for the red color component of the set of data points, and a second visualization for the luminous component of the set of data points.

In some embodiments, 3D analysis tool 200 may present (at 718) the visualization at the bottom, top, and/or corner of a display that also presents a rendering of the set of data points from the current viewing position. Accordingly, 3D analysis tool 200 may be integrated with or part of 3D imaging application for viewing, manipulating, editing, and/or interacting with point clouds or other 3D imagery.

Process 700 may include adjusting (at 720) the visualization in response to movement of the current viewing position and/or editing of the set of data points. Adjusting (at 720) the visualization may include updating the visualization based on attribute values for a different set of data points that are within an adjusted slice that is derived from the changed viewing position. In some embodiments, 3D analysis tool 200 may receive a 3D video, and may adjust (at 720) the visualization based on changes to the attribute values of the set of data points between different frames and/or based movement of the current viewing position. Accordingly, 3D analysis tool 200 may adjust (at 720) the visualization in real-time and/or in response to any change in the attribute values or data points included as part of the visualization.

In some embodiments, 3D analysis tool 200 may perform an analysis of different visualizations to automatically detect similarity or difference between two sets of data points in the same or different point clouds of the same 3D environment or 3D object. The similarity or difference may be quantified by 3D analysis tool 200 to a different scale or measure. For instance, 3D analysis tool 200 may detect an amount of growth, temperature change, decay, inflammation, and/or other variation in the imaged 3D environment or 3D object based on the similarities or differences in different visualizations that 3D analysis tool 200 generates for the 3D environment or 3D object at different times.

Figure 8:
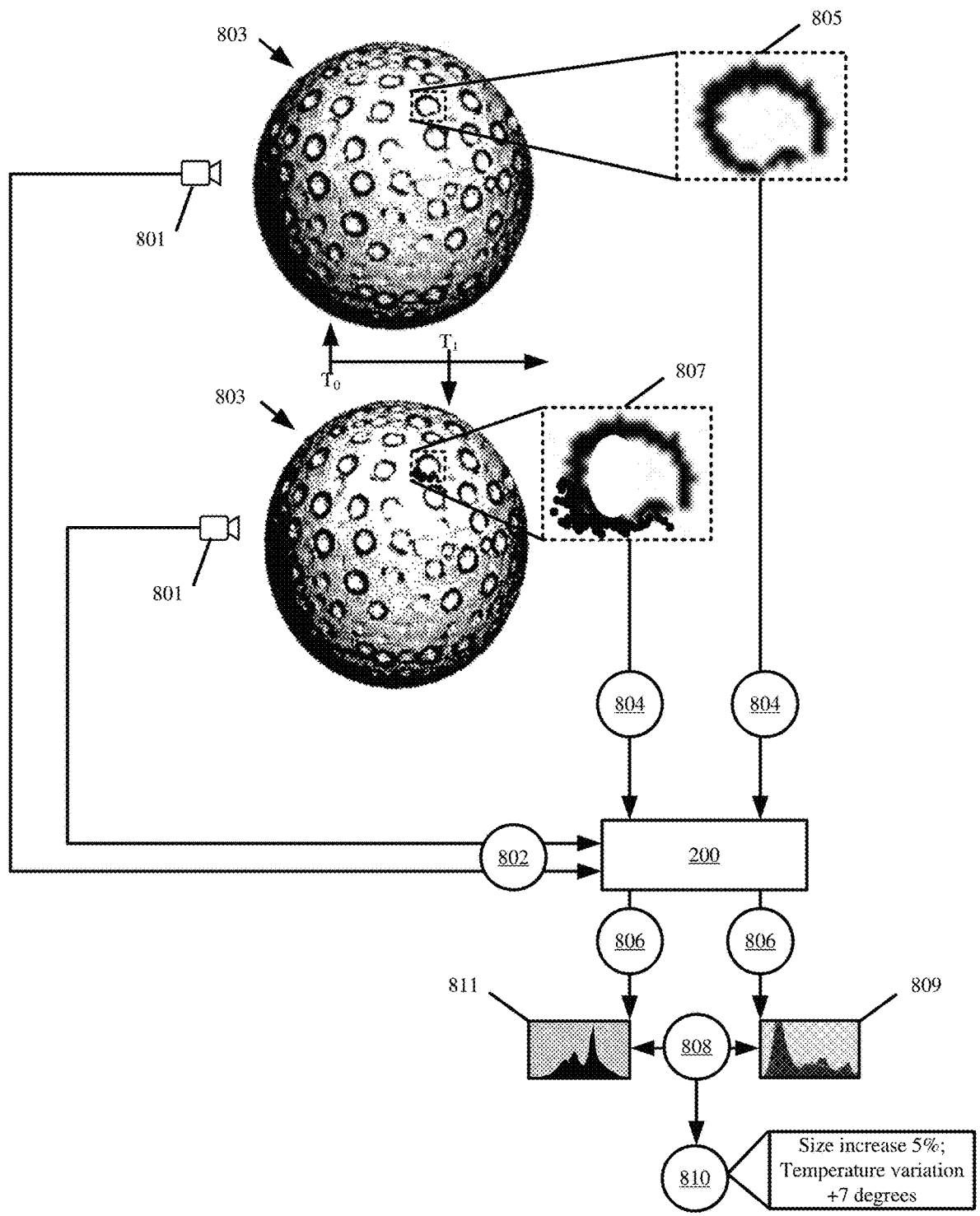
FIG. 8 illustrates an example of automatically detecting similarity or difference based on the 3D visualizations in accordance with some embodiments presented herein.

FIG. 8 illustrates an example of automatically detecting similarity or difference based on the 3D visualizations in accordance with some embodiments presented herein. As shown in FIG. 8, imaging device 801 may produce different point clouds or 3D images of 3D object 803 at different times. The imagery may capture changes to 3D object 803 via changes in the positioning and/or attribute values of the data points.

3D analysis tool 200 may receive (at 802) the different point clouds or 3D images from imaging device 801, may select same viewing position in each point cloud, and may perform (at 804) attribute analysis for data points 805 and 807 falling in the same slice of the different point clouds at the selected viewing position, wherein the slice may be derived from the common viewing position and may represent the same volume of the 3D object even though the volume may include different attribute values and/or data points in the different point clouds.

3D analysis tool 200 may generate (at 806) first visualization 809 based on the attribute analysis for data points 805 of the first point cloud, and second visualization 811 based on the attribute analysis for data points 807 of the second point cloud. 3D analysis tool 200 may compare (at 808) visualizations 809 and 811, and/or the analysis for data points 805 and 807 to detect similarity and/or differences between the attributes.

3D analysis tool 200 may convert the detected similarities and/or differences from the comparison to a different scale or measure, and 3D analysis tool 200 may present (at 810) a graphical element that identifies and/or quantifies the detected similarity and/or differences. For instance, the analysis (at 804) and/or visualizations 809 and 811 may yield distributions for an infrared attribute across data points 805 and 807. The infrared attribute may be mapped to a temperature measure, and the detected difference for the attribute in data points 805 and 807 may be indicative of a temperature surge at a point in 3D object 803 that is represented by data points 805 and 807. In some embodiments, the similarities and/or differences detected in at least two compared visualizations may be mapped to measures of inflammation, decay, strength, density, texture, growth, movement, speed, and/or variation that occurs in the 3D object in between the time of the two or more compared images.

In some embodiments, 3D analysis tool 200 may use one or more visualizations in order to enhance the point cloud or 3D image, and/or to adjust settings of the imaging device that generates the point cloud or 3D image. For instance, 3D analysis tool may use the one or more visualizations to detect distortion in the imaging of a 3D object and/or unexpected or undesired variances in the brightness, coloring, and/or other attributes of the point cloud data points. The distortion may arise from imperfections in the lens used to capture the 3D image of the 3D object, wherein the imperfections may include rounding at the edges of the lens that may slightly distort the positioning and/or visual characteristics for the data points that capture the 3D object at the edges of the lens. The unexpected or undesired variances may arise when using multiple cameras or imaging devices to produce the stereoscopic or 3D image of an object, and the imaging devices are offset from one another. In such case, light may enter each imaging device at a different angle, from a different distance, and/or with other variations that may cause one imaging device to capture a brighter or more saturated image, and another imaging device to capture a darker or less saturated image. The images may be combined to produce the point cloud. However, the variations in the attributes may introduce the unexpected or undesired variances in the point cloud data points and/or an inaccurate 3D capture of the object.

In some embodiments, 3D analysis tool 200 may perform the attribute analysis, may generate the visualizations, and may adjust values for certain attributes of certain data points where distortion is found to occur. Alternatively, 3D analysis tool 200 may adjust hardware, imaging, and/or camera settings on one or more imaging devices to ensure an accurate capture of the object from different positions. For instance, 3D analysis tool 200 may adjust the focal length, aperture, depth of field, shutter speed, camera ISO, and/or other settings.

Figure 9:
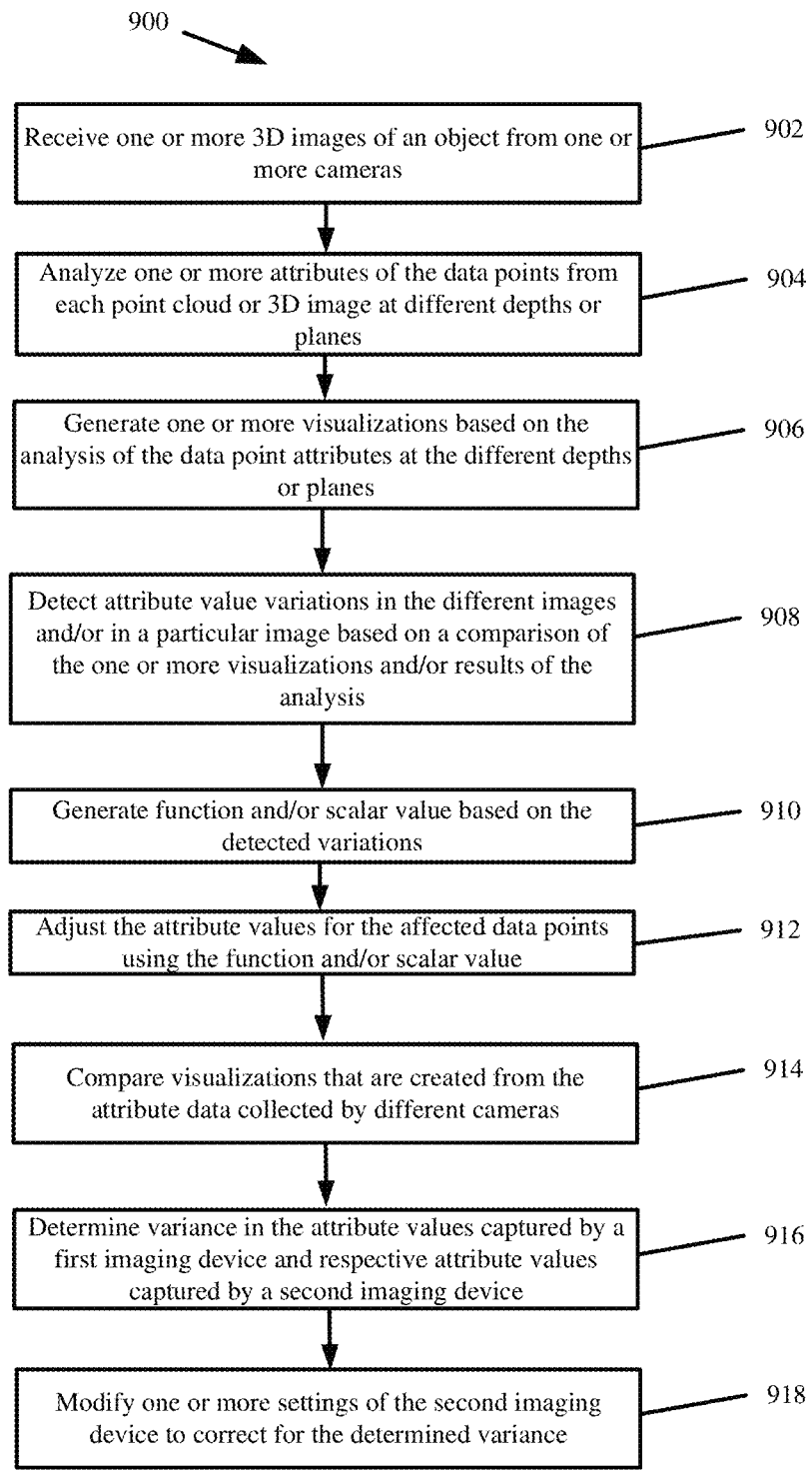
FIG. 9 presents a process for enhancing a 3D image and/or adjusting camera settings based on 3D visualizations of point cloud data point attributes in accordance with some embodiments presented herein.

FIG. 9 presents a process 900 for enhancing a 3D image and/or adjusting camera settings based on 3D visualizations of point cloud data point attributes in accordance with some embodiments presented herein. Process 900 may be implemented by 3D analysis tool 200.

Process 900 may include receiving (at 902) one or more 3D images of an object from one or more cameras. Each camera may produce a 3D image of the object from a different position or vantage point. Alternatively, the captured data from the images may be combined to produce a point cloud or other 3D representation of the object.

Process 900 may include analyzing (at 904) one or more attributes of the data points from each point cloud or 3D image at different depths or planes. Process 900 may include generating (at 906) one or more visualizations based on the analysis (at 904) of the data point attributes at the different depths or planes.

Process 900 may include detecting (at 908) variations in the attribute values for corresponding sets of data points in the different images and/or variation in the attribute values for data points of a particular image based on a comparison of the one or more visualizations and/or results of the analysis (at 904). For instance, 3D analysis tool may produce a distribution for one or more attribute values, and may determine that centrally located data points have attribute values within a particular range, whereas data points at the outer edges have outlying attribute values that are outside the particular range. Based on these attribute value differences, 3D analysis tool 200 may detect that the attribute values for data points at the outer edges of the point cloud suffer greater falloff or distortion than data points more centrally located in the point cloud. Such distortion may result from lens imperfections and/or variances in the light being captured for the outer edges of the object.

Process 900 may include generating (at 910) a function and/or scalar value based on the detected (at 908) variations, and adjusting the attribute values of an affected set of data points where the variance is detected using the function and/or scalar value. For instance, 3D analysis tool 200 may generate (at 910) a function and/or scalar value to account for the lens distortion affecting the outer edge data points, and may apply (at 912) the function and/or scalar value to the attribute values of the outer edge data points to correct the detected distortion, thereby enhancing the accuracy of the point clouds or 3D images.

In addition to enhancing the received images by directly adjusting attributes values for different data points of the images, 3D analysis tool 200 may also adjust hardware settings used in capturing the images. Accordingly, process 900 may include comparing (at 914) the visualizations that are created from the attribute data collected by different cameras. In particular, 3D analysis tool 200 may compare (at 914) distributions for one or more of the same attributes.

Process 900 may include determining (at 916) a variance in the attribute values captured by a first imaging device and the attribute values captured by a second imaging device. Specifically, 3D analysis tool 200 may determine (at 916) that the color attributes captured by the second imaging device are muted by 5% relative to the color attributes captured by the first imaging device.

Process 900 may include modifying (at 918) one or more of the focal length, aperture, depth of field, shutter speed, camera ISO, and/or other settings of the second imaging device. 3D analysis tool 200 may modify (at 918) the camera settings in order to correct for the variance. In particular, the modified camera settings may correct for any variance in the light reaching the different imaging devices due to their different positions.

Thus far, the visualizations generated by 3D analysis tool 200 have provided summarized or different representations for the data point attributes. In some embodiments, 3D analysis tool 200 may generate visualizations for validating the captured point cloud or 3D image. In some such embodiments, the visualizations may validate whether a point cloud or 3D image accurately captures a physical object or environment, and/or includes sufficient detail to digitize that physical object or environment.

In some embodiments, 3D analysis tool 200 may generate the validation visualizations as overlays that are displayed atop or in combination with the rendered object or environment. In some such embodiments, a visualization may be integrated as part of the rendered object, and may directly identify properties of the point cloud beyond the captured data points and the attributes or visual characteristics of those data points.

Figure 10:
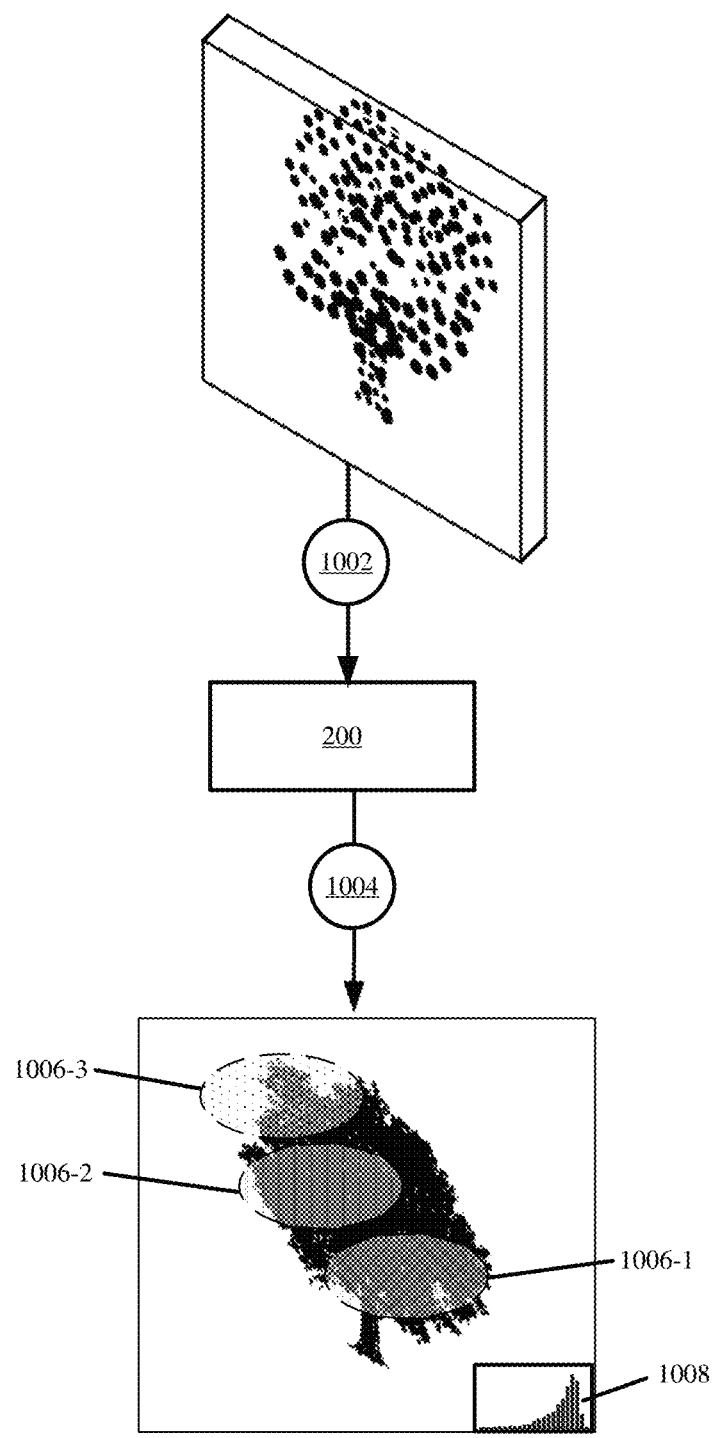
FIG. 10 illustrates an example of a validation visualization in accordance with some embodiments presented herein.

FIG. 10 illustrates an example of a validation visualization in accordance with some embodiments presented herein. In FIG. 10, 3D analysis tool 200 may receive (at 1001) a point cloud, and may determine the density of data points across the point cloud as one measure of validating the accuracy and/or quality of the point cloud or the object captured by the point cloud. For instance, 3D analysis tool 200 may compute the average density of data points in different areas, regions, or volumes of the point cloud to determine if there are sufficient data points to accurately render the object or environment that is represented by those data points, and may produce visualizations based on the computed density of data points.

Based on the determined and/or computed density, 3D analysis tool 200 may produce (at 1004) overlay visualizations 1006-1, 1006-2, and 1006-3 (sometimes collectively referred to as "overlay visualizations 1006" or individually as "overlay visualization 1006") that are presented over different regions of the rendered 3D object or point cloud. Accordingly, each overlay visualization 1006 may be provided for a different 3D volume or set of data points positioned about different planes of the point cloud.

3D analysis tool 200 may compile the data points that fall within the different regions covered by different visualizations 1006, may determine the physical space that is represented within the respective region, and may compute the density based on the number and/or positioning of data points relative to the determined space represented by the region. Each overlay visualization 1006 may use a different color, shading, or pattern to present the density of data points in each respective region. For instance, overlay visualization 1006-1 may provide a green border for a region in which the density of data points exceeds 100 data points per centimeter of space, overlay visualization 1006-2 may provide a yellow border for a region in which the density of data points is between 50-100 data points per centimeter of space, and overlay visualization 1006-3 may provide a red border for a region in which the density of data points is less than 50 data points per centimeter of space. In some embodiments, a user may configure density thresholds for each of overlay visualizations 1006-1, 1006-2, and 1006-3, and 3D analysis tool 200 may present overlay visualizations 1006 over corresponding regions of the point cloud with data point densities that satisfy the different configured density thresholds.

A user may refer to overlay visualizations 1006 to quickly visualize parts of the imaged object that are captured and/or represented with sufficient detail due to a large density or concentration of data points, and other parts of the image object that are captured and/or represented with insufficient detail due to insufficient density or concentration of data points. The user may refer to overlay visualizations 1006 in determining whether to retain a scan or capture of an object, or whether to rescan or recapture the object. For instance, generating a point cloud representation of an object from a first angle or first perspective may create certain lighting effects that result in lower densities of data points for certain regions of the imaged object, whereas generating the point cloud representation of the object from a different second angle or second perspective may provide more even or better lighting that increases the number, density, and/or concentration of data points that can be captured for the object across the different regions.

In some embodiments, 3D analysis tool 200 may automatically validate and retain a point cloud based or may invalidate and discard a point cloud based on the classification of different parts of the point cloud that are classified to different overlay visualizations 1006. For instance, if more than 20% of the point cloud is determined to have a density that is below a threshold amount, 3D analysis tool 200 may produce overlay visualization 1006 that identifies 20% of the point cloud data points that do not satisfy the density threshold, and may notify the user that the point cloud has insufficient quality to validated due to the data point density.

In some embodiments, 3D analysis tool 200 may provide separate visualization 1008 for the point cloud data point density. Visualization 1008 may be presented apart from the point cloud data points, 3D object visualization, and/or overlay visualizations 1006.

Visualization 1008 may provide a histogram, distribution, or other representation for the density of data points across the point cloud. In some embodiments, 3D analysis tool 200 may generate visualization 1008 based on a set of data points that are rendered onscreen. In other words, visualization 1008 may identify the density distribution for the set of data points falling within the field-of-view of a virtual camera. By referring to visualization 1008, a user may quickly determine if the point cloud data points are sparsely distributed, resulting in a low quality or low resolution capture of the object, or if the point cloud data points are densely distributed, resulting in a high quality or high resolution capture of the object.

Visualizations 1006 and 1008 may also be used to ascertain properties of the imaged object. In some embodiments, the different densities of data points identified by visualizations 1006 and/or 1008 may indicate areas of different strengths, rigidity, and/or density. For instance, different densities of data points at different regions of an object may correspond to different thickness, weight, and/or decay at the different regions. For scientific purposes, the density of data points may indicate the molecular structure or composition of the object at the different regions.

In some embodiments, the visualizations generated by 3D analysis tool 200 may be used to determine if the captured data points are within acceptable tolerances or thresholds. For instance, a point cloud capture of an object may result in some number of outlying data points. The outlying data points may be due to lighting anomalies (e.g., inconsistent shading across the surface of an object, bright reflections, etc.) or sensitivity of the sensor used to image the object. The outlying data points may have values (e.g., positional information, color values, luminance values, Tesla strength values, etc.) that vary by some threshold amount from the values of adjacent or neighboring data points.

A low number of data point outliers may have little or no impact on the final rendering of the captured object. However, a high number of data point outliers or a large concentration of data point outliers in one region of the point cloud may be indicative of a point cloud that does not accurately capture an object with sufficient detail. Accordingly, a point cloud or 3D image may be validated based on the data point outliers identified by 3D analysis tool 200 through different visualizations.

Figure 11:
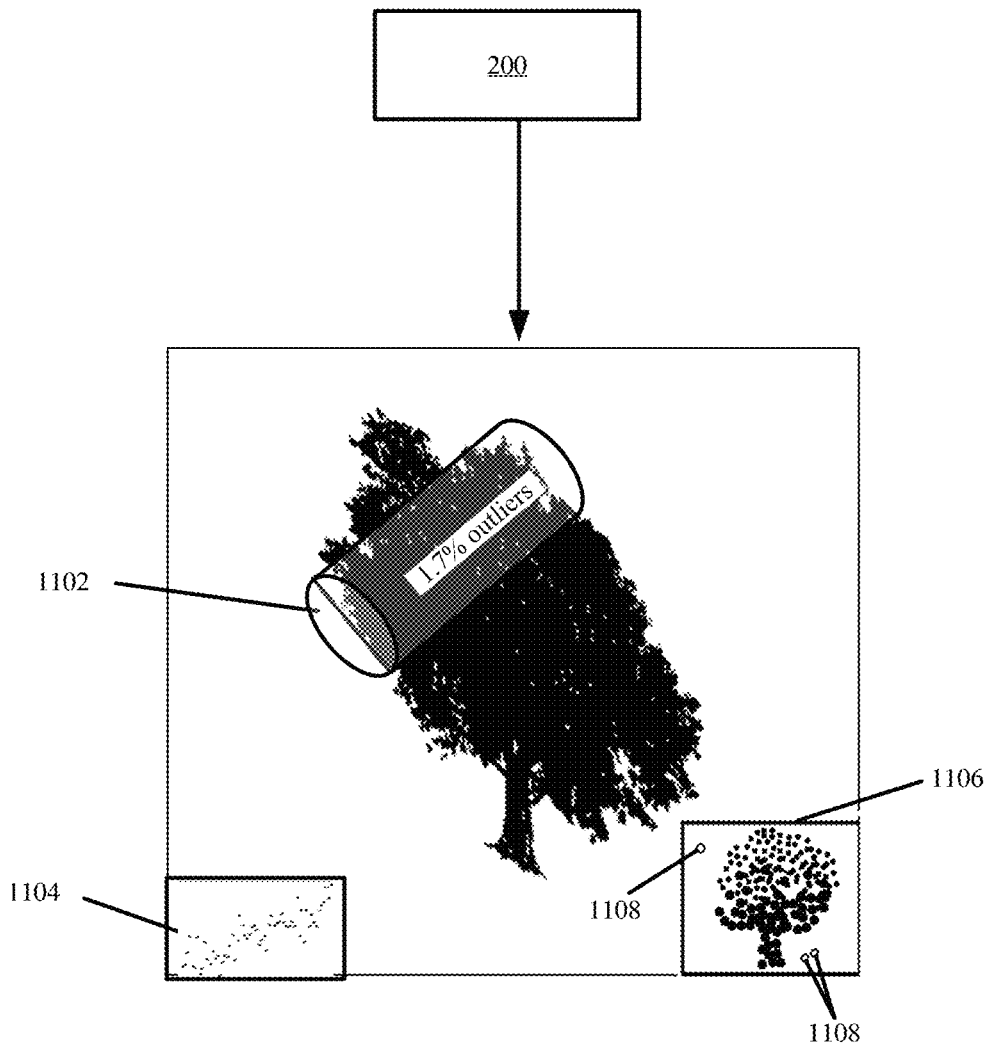
FIG. 11 illustrates an example of visualizations for outlier detection in accordance with some embodiments presented herein.

FIG. 11 illustrates an example of visualizations 1102, 1104, and 1106 for outlier detection in accordance with some embodiments presented herein. Visualization 1102 may correspond to an overlay visualization that identifies the number and/or percentage of outlying data points in a selected region of a point cloud. In some embodiments, visualization 1102 may display a value that quantifies the detected outlying data points, or may provide a first color when the percentage of outlying data points in the selected region of data points is less than a threshold (e.g., <5%), and a second color when the percentage of outlying data points in the selected region of data points is greater than the threshold (e.g., >=5%).

A user may set the threshold based on the object that is represented by the point cloud. For instance, the user may determine that an accurate capture of a flat, uniformly colored, and matte first object should have fewer than 1% outlying data points, and may set the threshold for visualization 1102 to be 1% for the point cloud representing the first object. The user may also determine that an accurate capture of a multi-faceted second object with different colors may have up to 5% outlying data points, and may set the threshold for visualization 1102 to be 5% for the representing the second object.

3D analysis tool 200 may generate visualization 1102 in response to receiving a selection of data points from a point cloud. The selection may include a 3D volume or a set of data points from the point cloud that fall within a field-of-view of a virtual camera from which the point cloud is to be rendered. 3D analysis tool 200 may inspect the attribute values of the data points in the selected region, may determine the number of data points that have one or more attribute values that vary from attribute values of neighboring data points by some variance threshold, and may generate visualization 1102 based on the detected number of outliers and a user configured outlier threshold. For instance, an outlying data point may include a data point with a color component value (e.g., red, green, blue, cyan, yellow, etc.), luminance value, chrominance value, and/or temperature value that varies from values of neighboring data points by 10%. A second threshold may then be used for graphically representing the number of outliers. For instance, visualization 1102 may have a first color when the number and/or percentage of data points with outlying attributes is less than the outlier threshold, and a second color when the number and/or percentage of data points with outlying attributes is greater than the outlier threshold.

Visualization 1104 may be presented separate from overlay visualization 1102. Visualization 1104 may provide a histogram, distribution, scatter plot, or other summarized presentation for the outlying data points of the point cloud or 3D image. For instance, visualization 1104 may identify the distribution of outlying data points for the point cloud plane or the set of data points that are rendered onscreen.

Visualization 1106 may be provided to identify data points that are positional outliers. A positional outlying data point may include a data point that is detached or separated from other data points of the point cloud by some threshold, and that may be generated due to lighting issues or sensor sensitivity when capturing the imaged object. For instance, a reflection may cause an imaging device to detect one or more data points off or away from the surface of an imaged object, and the one or more data points may incorrectly identify physical structures, surfaces, and/or other objects that do not exist.

Visualization 1106 may include a 2D graphical representation for the 3D data points of the point cloud, and a demarcation of positional outlying data points 1108. 3D analysis tool 200 may generate visualization 1106 by compressing the data points of point clouds about one or more axes. For instance, 3D analysis tool 200 may generate visualization 1106 by setting a common value for a particular axis or particular positional value (e.g., the x-axis value, the y-axis value, or the z-axis value) for each data point of the point cloud.

The 2D graphical representation more simply illustrates positional outlying data points 1108, and/or presents positional outlying data points 1108 that may otherwise be obscured or difficult to differentiate when viewing the point cloud from a particular angle or perspective, or because positional outlying data points 1108 are so far removed from other data points and are found in an area with a low concentration of data points. In some embodiments, a user may select a positional outlying data point 1108 in visualization 1106, and 3D analysis tool 200 may adjust the angle, perspective, or viewing position of the rendered point cloud to identify outlying data point 1108 in the 3D view. The user may remove outlying data points 1108 via interactions with the 3D rendering or visualization 1106.

In some embodiments, 3D analysis tool 200 may automatically detect and highlight the outlying data points in visualization 1106 or in the 3D rendered point cloud, and may provide the user the option to deselect one or more of the detect outlying data points, or to delete all of the outlying data points.

Figure 12:
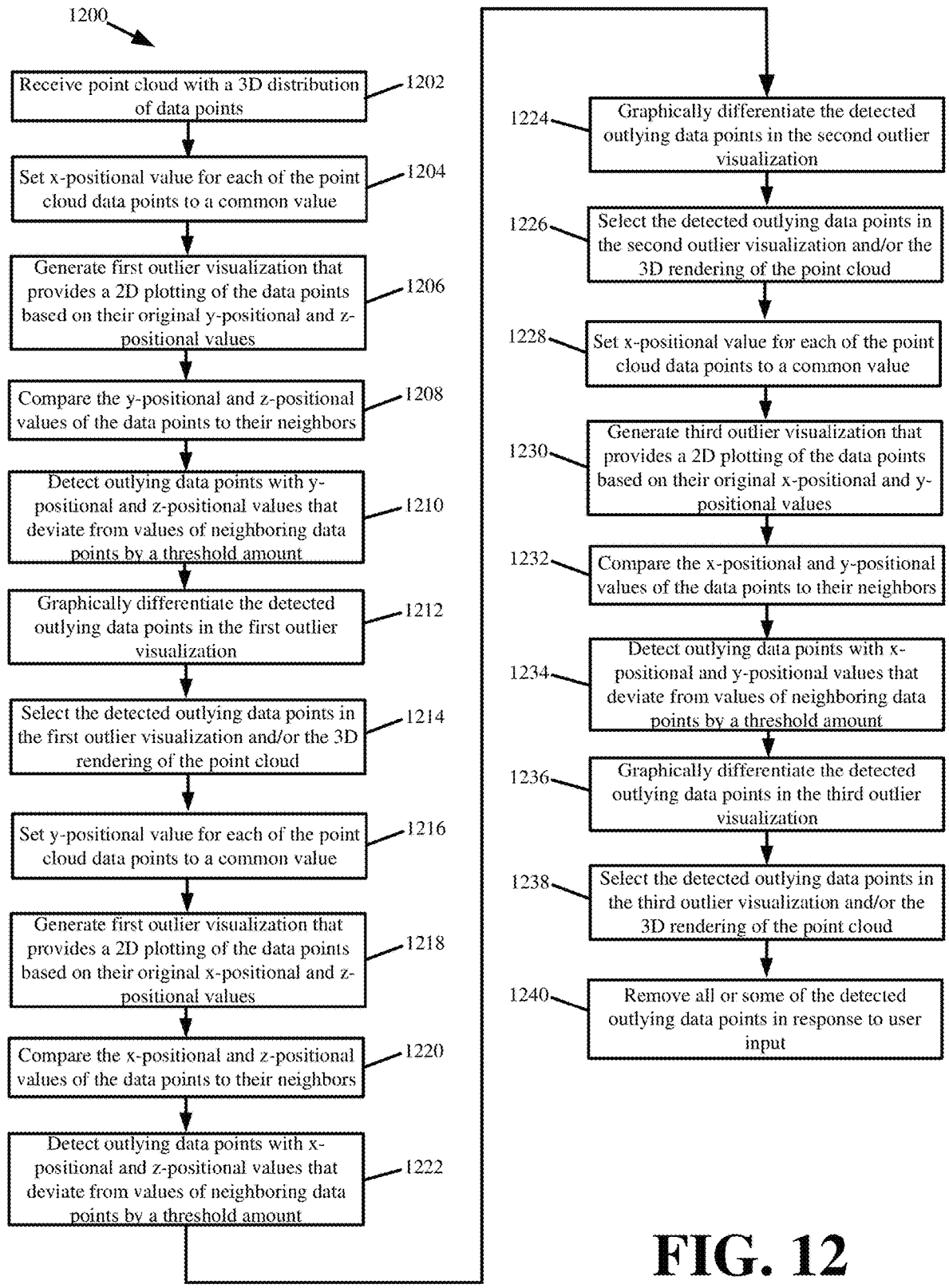
FIG. 12 presents a process for the automatic detection of outlying data points in accordance with some embodiments presented herein.

In some embodiments, 3D analysis tool 200 may generate visualization 1106 by performing three separate compressions of the point cloud data points about each of the three different dimensions and/or axes, and by locating the outlying data points about each compressed dimension and/or axis. FIG. 12 presents a process 1200 for the automatic detection of outlying data points in accordance with some embodiments presented herein. Process 1200 may be performed by 3D analysis tool 200 when rendering or presenting a point cloud with visualization 1106.

Process 1200 may include receiving (at 1202) a point cloud with a 3D distribution of data points. Process 1200 may include setting (at 1204) the x-positional value for each of the point cloud data points to a common value, and generating (at 1206) a first outlier visualization that provides a 2D plotting of the data points based on their original y-positional value and z-positional value.

Process 1200 may include comparing (at 1208) the y-positional and z-positional values of the data points to their neighbors, and detecting (at 1210) one or more outlying data points with y-positional and z-positional values that deviate from values of neighboring data points by a threshold amount. Process 1200 may include graphically differentiating (at 1212) the detected outlying data points in the first outlier visualization, and selecting (at 1214) the detected outlying data points in one or more of the first outlier visualization or the 3D rendering of the point cloud.

Process 1200 may then detect other outlying data points about the other axes. For instance, process 1200 may include setting (at 1216) the y-positional value for each of the point cloud data points to a common value, and generating (at 1218) a second outlier visualization that provides a 2D plotting of the data points based on their original x-positional value and z-positional value. Process may include comparing (at 1220) the x-positional and z-positional values of the data points to their neighbors, and detecting (at 1222) one or more outlying data points with x-positional and z-positional values that deviate from values of neighboring data points by a threshold amount. Process 1200 may include graphically differentiating (at 1224) the detected outlying data points in the second outlier visualization, and selecting (at 1226) the detected outlying data points in one or more of the second outlier visualization or the 3D rendering of the point cloud.

Process 1200 may further include setting (at 1228) the z-positional value for each of the point cloud data points to a common value, generating (at 1230) a third outlier visualization that provides a 2D plotting of the data points based on their original x-positional value and y-positional value, comparing (at 1232) the x-positional and y-positional values of the data points to their neighbors, and detecting (at 1234) one or more outlying data points with x-positional and y-positional values that deviate from values of neighboring data points by a threshold amount. Process 1200 may include graphically differentiating (at 1236) the detected outlying data points in the third outlier visualization, and selecting (at 1238) the detected outlying data points in one or more of the third outlier visualization or the 3D rendering of the point cloud.

In some embodiments, process 1200 may combine the first, second, and third outlier visualizations into a single visualization (e.g., visualization 1106), or may present them at the same time in a particular arrangement. Process 1200 may include automatically removing (at 1240) all or some of the detected outlying data points in response to user input that may be provided via direct interactions with the outlier visualizations.

In some embodiments, 3D analysis tool 200 may be a standalone device or service that receives point clouds and/or 3D images from a capture device, and that processes the point clouds or 3D images to include the visualizations and/or enhancements prior to the point clouds or 3D images being rendered on a user device. In some other embodiments, 3D analysis tool 200 may be a component or service that is integrated as part of another device. For instance, 3D analysis tool 200 may be integrated as part of a camera or imaging device, may provide the visualizations in real-time as the camera or imaging device captures point clouds or 3D images of a 3D environment or 3D object, may automatically enhance the images in response to detected variance, and/or may automatically adjust settings of the camera or imaging device in response to detected variations. Similarly, 3D analysis tool 200 may be integrated in a point cloud or 3D image rendering application on a user device, and may produce the visualizations and/or image enhancements for the image rendering application.

Figure 13:
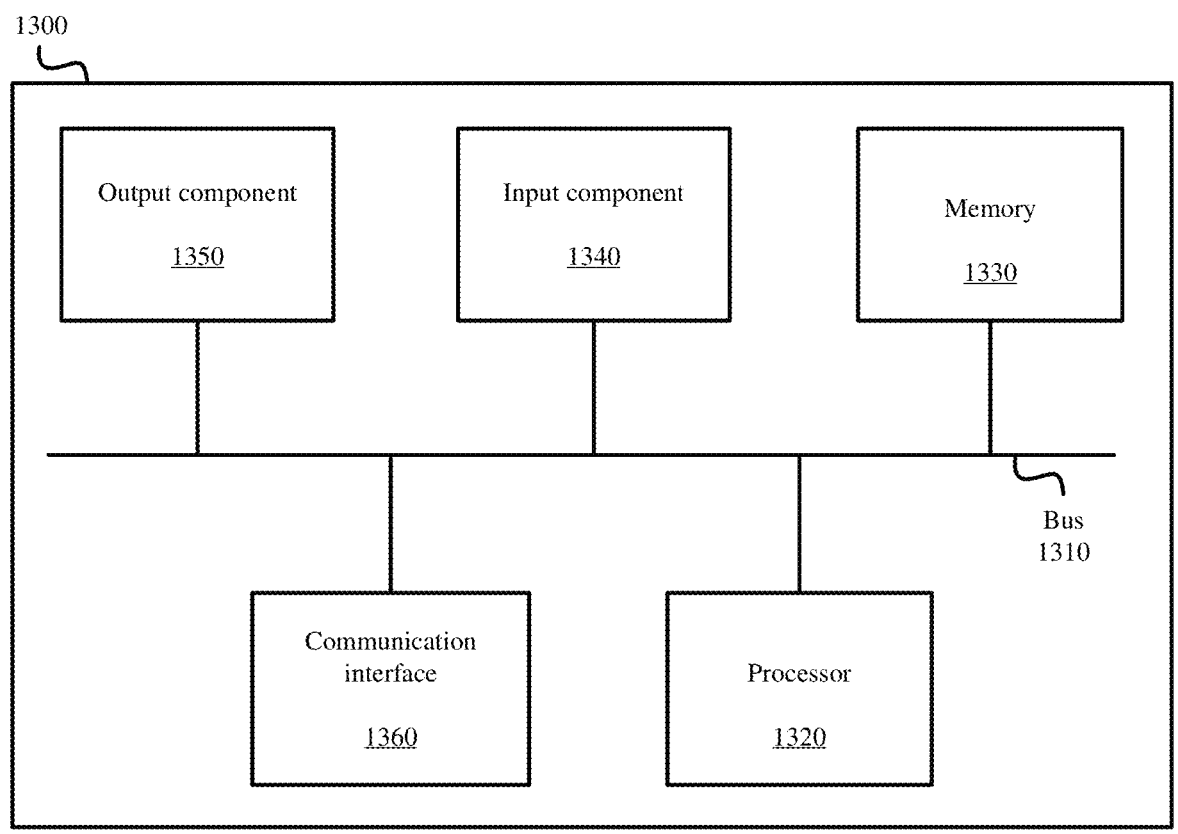
FIG. 13 illustrates example components of one or more devices, according to one or more embodiments described herein.

FIG. 13 is a diagram of example components of device 1300. Device 1300 may be used to implement one or more of the devices or systems described above (e.g., 3D analysis tool 200, 3D imaging device, camera, etc.). Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a point cloud comprising a plurality of data points that are distributed across a plurality of different planes and that collectively produce a three-dimensional ("3D") image, each data point of the plurality of data points comprising a set of elements with values that define a position of the data point in 3D space and attributes that specify visual characteristics of the data point;
   selecting a set of the plurality of data points that are located within a particular slice of the point cloud, wherein the set of data points comprises fewer data points than the plurality of data points;
   determining a position of a camera relative to the set of data points;
   ordering the set of data points to a set of planes based on a distance between the position of each data point from the set of data points and the position of the camera;
   generating a first visualization by rendering the visual characteristics of each particular data point of the set of data points at the position defined for that particular data point in the 3D space by the values of that particular data point;
   generating a second visualization that positions each particular data point of the set of data points based on one or more of the attributes that specify the visual characteristics of the particular data point rather than positioning the particular data point based on the position defined by the values of that particular data point, wherein generating the second visualization comprises generating a different layer for the second visualization based on the visual characteristics of each subset of the set of data points that are ordered to a different plane of the set of planes as a result of said ordering; and
   presenting the first visualization and the second visualization together on a display, wherein the second visualization presents the one or more attributes for the set of data points in a different format than the rendering of the set of data points in the first visualization.

2. The method of claim 1 further comprising:
   defining the particular slice to include two or more planes of the plurality of different planes; and
   wherein selecting the set of data points comprises selecting a first subset of data points within a first plane of the two or more planes, and a second subset of data points within a second plane of the two or more planes.

3. The method of claim 2, wherein generating the second visualization further comprises:
   generating a first layer of the second visualization based on the one or more attributes of the first subset of data points that are ordered to a first plane of the set of planes;
   generating a second layer of the second visualization based on the one or more attributes of the second subset of data points that are ordered to a second plane of the set of planes; and
   providing a 3D visualization that changes between the first layer and the second layer in response to changing a viewpoint of the rendering from the first subset of data points to the second subset of data points.

4. The method of claim 1, wherein selecting the set of data points comprises identifying the set of data points that are positioned in a field-of-view of the camera.

5. The method of claim 1 further comprising: changing the second visualization from presenting the one or more attributes of the set of data points to one or more attributes of a different second set of data points in response to a presentation of the point cloud changing from the rendering of the set of data points to a rendering of the different second set of data points.

6. The method of claim 1 further comprising: determining a distribution based on one or more visual characteristics of the set of data points that are specified in the one or more attributes; and wherein generating the second visualization further comprises producing a visual representation of the distribution to present with the rendering of the set of data points.

7. The method of claim 1, wherein generating the second visualization further comprises producing a histogram representation, a waveform representation, or a vectorscope representation that positions each data point of the set of points based on values for the one or more attributes.

8. The method of claim 1 further comprising: determining a change in viewing position of the point cloud from the set of data points to a different second set of data points; and modifying the second visualization to provide an alternate representation of the one or more attributes for the different second set of data points in response to determining the change in the viewing position.

9. The method of claim 1 further comprising: defining the particular slice as a volume in 3D space; and wherein selecting the set of data points comprises determining that each of the set of data points comprises a position within said volume.

10. The method of claim 1, wherein the second visualization excludes the one or more attributes from other data points of the plurality of data points that are not within the set of data points and that are not rendered as part of the first visualization.

11. The method of claim 1 further comprising: detecting a variation in the one or more attributes between a first subset and a second subset of the set of data points based on the second visualization; and adjusting the one or more attributes of the first subset of data points, while retaining the one or more attributes of the second subset of data points, in response to detecting the variation.

12. The method of claim 1 further comprising: detecting variation in the second visualization or between the second visualization and a third visualization that is generated from a subsequent imaging of a common object; and modifying one or more settings of an imaging device used to capture the point cloud based on the variation.

13. The method of claim 1, wherein each layer of the second visualization positions a different subset of the set of data points that are ordered to a different plane based on a distribution, range of values, or derived values for the visual characteristics of that subset of data points.

14. The method of claim 1 further comprising: detecting input at a particular point along the second visualization; and providing dynamic information based on the attributes of one or more data points from the first visualization that are represented at the particular point along the second visualization in response to said detecting.

15. A device comprising: one or more processors configured to:
  receive a point cloud comprising a plurality of data points that are distributed across a plurality of different planes and that collectively produce a three-dimensional ("3D") image, each data point of the plurality of data points comprising a set of elements with values that define a position of the data point in 3D space and attributes that specify visual characteristics of the data point;
  select a set of the plurality of data points that are located within a particular slice of the point cloud, wherein the set of data points comprises fewer data points than the plurality of data points;
  determine a position of a camera relative to the set of data points;
  order the set of data points to a set of planes based on a distance between the position of each data point from the set of data points and the position of the camera;
  generate a first visualization by rendering the visual characteristics of each particular data point of the set of data points at the position defined for that particular data point in the 3D space by the values of that particular data point;
  generate a second visualization that positions each particular data point of the set of data points based on one or more of the attributes that specify the visual characteristics of the particular data point rather than positioning the particular data point based on the position defined by the values of that particular data point, wherein generating the second visualization comprises generating a different layer for the second visualization based on the visual characteristics of each subset of the set of data points that are ordered to a different plane of the set of planes as a result of said ordering; and
  present the first visualization and the second visualization together on a display, wherein the second visualization presents the one or more attributes for the set of data points in a different format than the rendering of the set of data points in the first visualization.

16. The device of claim 15, wherein the one or more processors are further configured to:
  define the particular slice to include two or more planes of the plurality of different planes; and
  wherein selecting the set of data points comprises selecting a first subset of data points within a first plane of the two or more planes, and a second subset of data points within a second plane of the two or more planes.

17. The device of claim 16, wherein generating the second visualization further comprises:
  generating a first layer of the second visualization based on the one or more attributes of the first subset of data points that are ordered to a first plane of the set of planes;
  generating a second layer of the second visualization based on the one or more attributes of the second subset of data points that are ordered to a first plane of the set of planes; and providing a 3D visualization that changes between the first layer of the second visualization and the second layer of the second visualization in response to changing a viewpoint of the rendering from the first subset of data points to the second subset of data points.

18. The device of claim 15, wherein the one or more processors are further configured to:
   display the first visualization with the rendering of the set of data points; and
   change the second visualization from presenting the one or more attributes of the set of data points to one or more attributes of a different second set of data points in response to a presentation of the point cloud changing from the rendering of the set of data points to a rendering of the different second set of data points.

19. A non-transitory computer-readable medium, storing a plurality of processor-executable instructions to:
   receive a point cloud comprising a plurality of data points that are distributed across a plurality of different planes and that collectively produce a three-dimensional ("3D") image, each data point of the plurality of data points comprising a set of elements with values that define a position of the data point in 3D space and attributes that specify visual characteristics of the data point;
   select a set of the plurality of data points that are located within a particular slice of the point cloud, wherein the set of data points comprises fewer data points than the plurality of data points;
   determine a position of a camera relative to the set of data points;
   order the set of data points to a set of planes based on a distance between the position of each data point from the set of data points and the position of the camera;
   generate a first visualization by rendering the visual characteristics of each particular data point of the set of data points at the position defined for that particular data point in the 3D space by the values of that particular data point;
   generate a second visualization that positions each particular data point of the set of data points based on one or more of the attributes that specify the visual characteristics of the particular data point rather than positioning the particular data point based on the position defined by the values of that particular data point, wherein generating the second visualization comprises generating a different layer for the second visualization based on the visual characteristics of each subset of the set of data points that are ordered to a different plane of the set of planes as a result of said ordering; and
   present the first visualization and the second visualization together on a display, wherein the second visualization presents the one or more attributes for the set of data points in a different format than the rendering of the set of data points in the first visualization.

* * * * *